W. H. HALSEY.
Apparatus for and Process of Forming Thimble-Blanks of Celluloid and other Materials.
No. 224,682. Patented Feb. 17, 1880.
Fig. 1.
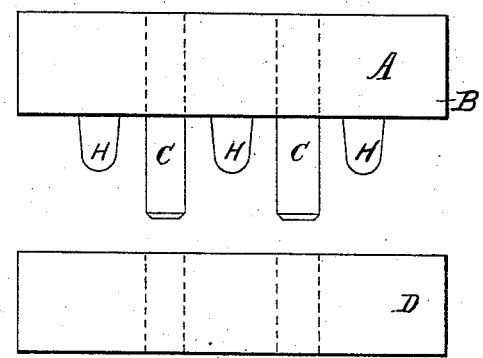
Fig. 2.
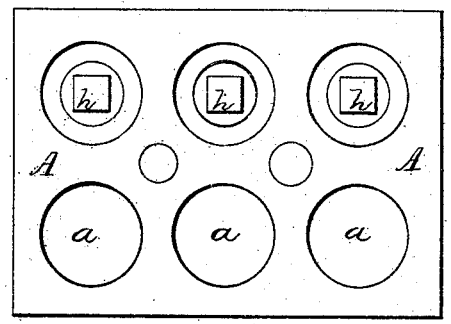
Fig. 3.
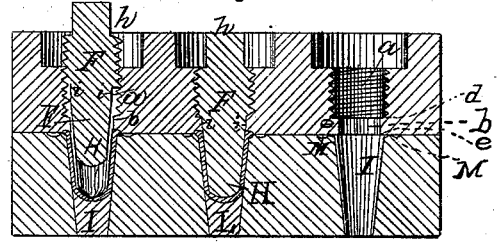
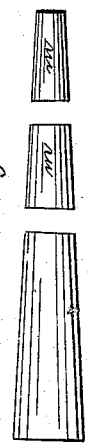
Fig. 5.
Attest:
Joseph Coult
James A. Brady
Inventor.
William H Halsey
Newark New Jersey

UNITED STATES PATENT OFFICE.

WILLIAM H. HALSEY, OF NEWARK, NEW JERSEY, ASSIGNOR TO THE CELLULOID FANCY GOODS COMPANY, OF SAME PLACE.

APPARATUS FOR AND PROCESS OF FORMING THIMBLE-BLANKS OF CELLULOID AND OTHER MATERIALS.

SPECIFICATION forming part of Letters Patent No. 224,682, dated February 17, 1880.

Application filed January 7, 1880.

*To all whom it may concern:*

Be it known that I, WILLIAM H. HALSEY, of the city of Newark, in the county of Essex and State of New Jersey, have invented a new and useful Improvement in Apparatus and Process for Forming Thimble-Blanks of Celluloid and other Materials, of which the following is a specification, reference being had to the accompanying drawings.

The invention relates to an improved apparatus and process for making thimbles, and in the present instance is utilized in the production of thimble-blanks from plastic composition, though it may be successfully applied in forming such devices from malleable or ductile material of any order.

The apparatus consists of a male and female die connected by dowels or guides, the former provided with a conical mold or ejector, which is capable of vertical movement and fits coincidently as to axes into a corresponding cavity in the female die, in the base of which cavity is provided a movable plug.

The process consists in severing a tube of plastic composition or other material into sections, one of which is placed in the cavity in the female die and operated upon by the ejector, which forces the section into the cavity and against the plug at its base, thus forming the blank, and causing the end of the section to unite and form the head or tip of the blank, all as hereinafter set forth.

It has been found that by the apparatus herein presented the material known as "celluloid" is admirably adapted for the construction of thimbles, as it can be readily molded when warm, and when it has become cool is hard, elastic, and durable.

In the accompanying drawings, Figure 1 represents the side of the die, the two sections of which are separated. Fig. 2 is a top view of the die. Fig. 3 is a central vertical longitudinal section of the die, showing three cavities, in which the thimbles are formed, one cavity being empty, the next containing the plug F and the plastic material compressed into the form of a thimble. In the third cavity the plug is shown partially withdrawn and stripped of the thimble. Fig. 4 is a side view of the tube and sections from which the thimbles are formed. Fig. 5 is a vertical section of the plug L.

In the accompanying drawings, A represents the die or apparatus, consisting of the male die B and female die D, which are provided with suitable dowels or guides to cause proper co-operation. The male die B is provided with one or more cavities, $a$, having a female thread and extending through the greater portion of the die.

Axially coincident with the cavity $a$ is provided the circular aperture $b$, of smaller diameter than the cavity, hence having about its periphery a seat, $d$, the edge of the aperture on the face of the die being cut away to form the annular groove $e$.

F is an ejector, and consists of a shoulder, $h$, or other means of effecting rotation, below which the material is expanded, and has a male thread of such size as to be operable in the female thread in the cavity $a$. The lower part of this threaded portion terminates in a square shoulder, below which is an annular shoulder, $i$, corresponding in width to that of the sides of the aperture $b$. Below the shoulder $i$ is formed the conical stud H, having its extremity convex.

Now, it is plain that when the male thread on the ejector is worked down until the shoulder at its base comes in contact with the seat $d$ the movement of the ejector is determined, and, as the shoulder $i$ thereon is the same in width as the periphery of the aperture $b$, this brings the base of the stud H in juxtaposition to the annular groove $e$, which thus forms a channel about the base of the stud, serving to receive the edge of the thimble-blank when being formed.

The center of the female die D is occupied by a conical cavity, I, in the base of which fits the conical plug L, the upper surface of which is concave and provided with the projections $l$, to knurl the end of the blank when pressed upon them. About the cavity I, and divided therefrom by a narrow ridge, is the overflow-recess M, whence air-ducts may be led outward, if desired.

In the present instance the shoulder $h$ projects above the upper surface of the male die; but in practice this shoulder should be sunk below the said surface, so as not to interfere with the operation of pressing.

The process in hand consists in forming the material to be manipulated into a tube from which sections m are removed, varying in size according to the size of the thimble desired. It is to be here noted that the exterior circumference of the tube should be about that of the cavity I midway between its mouth and the plug L. One of the said sections m is placed in the cavity I, into which it partially descends, leaving a portion projecting above the surface of the die, which, with the male die, is heated to a proper degree to soften the material. The head of the stud H is now placed in the upper end of the section m, and pressure gradually applied to the dies, which causes them to close the stud as it descends, forcing the softened section downward, gradually densifying and attenuating it, while the shape of the cavity I causes the lower edge of the section to contract or curl inward until this portion reaches the concavity in the plug L, which causes it to assume a convex form, the edge meeting, and, under the combined heat and pressure, being welded into a homogeneous end or tip, the exterior of which is suitably knurled. Meantime the section has been affected by the operation of the stud, the body of the blank being formed between it and the walls of the cavity, while such of the material as may enter the annular groove e forms the rim or flange at the base of the thimble, any surplus material being received into the overflow-recess M.

It is plain that the stud H and plug L may be so arranged that a suitable space is left between them to accommodate enough of the material to make the tip of the thimble as much thicker than the remainder as may be desired.

By the above operation the blank is formed, and when the dies are parted will be found adhering to the stud, to remove the blank wherefrom it is only necessary to rotate the ejector, whereby the stud H is drawn or freed from the blank; or, if the blank adheres in the cavity I, it may be removed by simply pressing the plug L upward.

What I claim as my invention, and desire to secure by Letters Patent, is—

1. In a die for forming thimble-blanks, the movable stud H, substantially as specified.

2. In a die for forming thimble-blanks, the movable plug L, substantially as set forth.

3. The movable stud H, in combination with the cavity I, provided with the plug L, substantially as set forth.

4. The stud H, capable of retraction, in combination with a stripping surface or edge, substantially as set forth.

5. In a die for forming thimbles, a molding-cavity having a movable base, substantially as set forth.

6. The cavity I, provided with the plug L and circumjacent overflow-recess M, in combination with the stud H, substantially as specified.

7. The within-described process of forming thimble-blanks, which consists, first, in forming the material to be manipulated into a tube; second, severing such tube into sections; third, pressing such sections in suitably-shaped dies, substantially as set forth.

In testimony that I claim the foregoing improvement in apparatus and process for forming thimble-blanks, as above described, I have hereunto set my hand this 5th day of October, 1878.

WILLIAM H. HALSEY.

Witnesses:
JOSEPH COULT,
ABRAHAM MANNERS.